(12) United States Patent
Van Maren et al.

(10) Patent No.: US 11,821,329 B2
(45) Date of Patent: Nov. 21, 2023

(54) AUXILIARY COMPONENT MOUNTING SYSTEM FOR GAS TURBINE ENGINES

(71) Applicant: RAYTHEON TECHNOLOGIES CORPORATION, Farmington, CT (US)

(72) Inventors: Aidan C Van Maren, Portland, CT (US); Octavio Martin, Broad Brook, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/408,138

(22) Filed: Aug. 20, 2021

(65) Prior Publication Data

US 2023/0057017 A1    Feb. 23, 2023

(51) Int. Cl.
    *F01D 25/24*    (2006.01)

(52) U.S. Cl.
    CPC ...... *F01D 25/24* (2013.01); *F05D 2260/4031* (2013.01)

(58) Field of Classification Search
    CPC .......................... F01D 25/24; F05D 2260/4031
    USPC ....................................................... 415/121.3
    See application file for complete search history.

(56) References Cited

U.S. PATENT DOCUMENTS

| | | | |
|---|---|---|---|
| 6,170,252 B1 * | 1/2001 | Van Duyn | F01D 21/04 60/226.1 |
| 7,093,996 B2 | 8/2006 | Wallace et al. | |
| 8,104,736 B2 | 1/2012 | Callaghan | |
| 8,814,462 B2 | 8/2014 | Care | |
| 9,046,041 B2 | 6/2015 | Rejman et al. | |
| 9,982,605 B2 | 5/2018 | Robertson et al. | |
| 10,215,100 B2 | 2/2019 | Jiang et al. | |
| 10,247,038 B2 | 4/2019 | Kappes et al. | |
| 10,578,204 B2 | 3/2020 | Martin | |
| 11,015,698 B2 | 5/2021 | Jiang et al. | |
| 2013/0042630 A1 * | 2/2013 | Muldoon | F02C 7/32 60/796 |
| 2014/0084130 A1 * | 3/2014 | Rejman | F02C 7/32 248/646 |

(Continued)

FOREIGN PATENT DOCUMENTS

| | | |
|---|---|---|
| EP | 3219961 | 9/2017 |
| EP | 3219963 | 9/2017 |

(Continued)

OTHER PUBLICATIONS

USPTO; Office Action dated Sep. 16, 2022 in U.S. Appl. No. 17/492,417.

(Continued)

*Primary Examiner* — Hung Q Nguyen
*Assistant Examiner* — Anthony Donald Taylor, Jr.
(74) *Attorney, Agent, or Firm* — SNELL & WILMER L.L.P.

(57) ABSTRACT

An assembly for mounting an auxiliary component to an engine case of a gas turbine includes a support bracket, the support bracket having a first end configured for attachment to a first flange of the engine case, a second end configured for attachment to a second flange of the engine case, and an intermediate portion located intermediate the first end and the second end; a bearing member disposed within the intermediate portion; and a mechanical fuse disposed within the bearing member.

20 Claims, 7 Drawing Sheets

(56) References Cited

U.S. PATENT DOCUMENTS

| | | | |
|---|---|---|---|
| 2014/0314546 A1* | 10/2014 | Davis | F01D 21/045 |
| | | | 415/124.1 |
| 2016/0017811 A1* | 1/2016 | Martin | F02C 3/04 |
| | | | 60/805 |
| 2017/0260908 A1* | 9/2017 | Jiang | F02C 7/32 |
| 2017/0260909 A1* | 9/2017 | Jiang | F02C 7/32 |
| 2017/0260910 A1* | 9/2017 | Jiang | F01D 25/28 |
| 2018/0058568 A1* | 3/2018 | Martin | F01D 25/28 |

FOREIGN PATENT DOCUMENTS

| | | |
|---|---|---|
| EP | 3287624 | 2/2018 |
| EP | 3633164 | 4/2020 |
| WO | 2007064388 | 6/2007 |
| WO | 2014100817 | 6/2014 |
| WO | 2014137575 | 9/2014 |

OTHER PUBLICATIONS

European Patent Office, European Search Report dated Jan. 10, 2023 in Application No. 22188794.6.

European Patent Office, European Search Report dated Jan. 10, 2023 in Application No. 2218889.4.

USPTO; Notice of Allowance dated Jan. 26, 2023 in U.S. Appl. No. 17/492,417.

USPTO; Corrected Notice of Allowance dated Feb. 17, 2023 in U.S. Appl. No. 17/492,417.

* cited by examiner

AUXILIARY COMPONENT MOUNTING SYSTEM FOR GAS TURBINE ENGINES

FIELD

The present disclosure relates generally to gas turbine engines and, more particularly, to auxiliary component mounting systems for gas turbine engines.

BACKGROUND

Gas turbine engines typically utilize a turbine fan to draw ambient air into the engine for compression and combustion by the engine. The turbine fan is shrouded by an engine casing. Various auxiliary components, such as electrical boxes, engine oil tanks, gearboxes, valves, control systems for regulating engine operations, and other components, are mounted to the engine casing. Various mounting systems mount the auxiliary components to the engine casing.

Conventional mounting systems may become subjected to a high degree of shock loading not experienced during normal engine operating conditions. For example, a high shock load may result from a fan blade out event, which occurs when a fan blade breaks off of an engine rotor body. A fan-blade out event may also result in an imbalance in the engine rotor body which may cause outward deflection and a rotor body shaft imbalance. The mounting system may not be able to withstand the high shock load of a fan blade out event, causing separation of the auxiliary components from the engine casing. Or, the mounting system may transfer the high shock load to the auxiliary components, causing damage to the auxiliary components.

Auxiliary components of particular concern include the gearboxes used to drive other components of the gas turbine engine. As part of an aircraft engine design, gearboxes are subjected to competing criteria. For example, on one hand, it may be desirable to use light-weight materials as part of the gearbox hardware in order to reduce aircraft weight. On the other hand, the gearbox materials must be sufficiently strong and durable in order to withstand various loads. Fan blade out (FBO) loads are often the limiting factor as part of a conventional gearbox design. A FBO may result in large rotor imbalance loads based on a fan blade becoming detached from a fan hub or rotor. As part of gearbox designs, mechanical fuses may be incorporated into the gearbox mounting systems. Such mechanical fuses may alleviate the need to otherwise over-design the gearbox hardware to withstand such rotor imbalance loads and to protect against a FBO event.

SUMMARY

An assembly for mounting an auxiliary component to an engine case of a gas turbine engine is disclosed. In various embodiments, the assembly includes a support bracket, the support bracket having a first end configured for attachment to a first flange of the engine case, a second end configured for attachment to a second flange of the engine case, and an intermediate portion located intermediate the first end and the second end; a bearing member disposed within the intermediate portion; and a mechanical fuse disposed within the bearing member.

In various embodiments, the mechanical fuse includes a central portion, a radially inner wall attached to the central portion and a radially outer wall with respect to a central axis extending through the central portion of the mechanical fuse. In various embodiments, the radially inner wall and the radially outer wall are separated by a gap. In various embodiments, the mechanical fuse includes a first fuse section extending annularly about the radially outer wall. In various embodiments, the first fuse section is formed by a first annular cut extending circumferentially about the radially outer wall with respect to the central axis. In various embodiments, the mechanical fuse includes a plate member configured for mounting the mechanical fuse to the auxiliary component. In various embodiments, the first fuse section is located proximate a base of the gap and above the plate member with respect to the central axis.

In various embodiments, the mechanical fuse includes a second fuse section extending annularly about the radially inner wall. In various embodiments, the second fuse section is formed by a second annular cut extending circumferentially about the radially inner wall with respect to the central axis. In various embodiments, the second fuse section is located proximate a top of the gap, the top of the gap spaced an axial distance from the base of the gap. In various embodiments, a cap member connected to the radially outer wall and disposed radially inside of the radially inner wall. In various embodiments, the second annular cut is disposed proximate the cap member.

In various embodiments, the central portion and the radially inner wall are formed from a first piece of material and wherein the radially outer wall is formed from a second piece of material. In various embodiments, the mechanical fuse includes a plate member configured for mounting the mechanical fuse to the auxiliary component, the plate member including an axially upper portion connected to the radially outer wall and an axially lower portion connected to the radially inner wall.

A gas turbine engine is disclosed. In various embodiments, the gas turbine engine includes an engine case, the engine case including a first flange and a second flange; a support bracket, the support bracket having a first end configured for attachment to the first flange of the engine case, a second end configured for attachment to the second flange of the engine case, and an intermediate portion located intermediate the first end and the second end; a bearing member disposed within the intermediate portion; a mechanical fuse disposed within the bearing member; and a gearbox attached to the mechanical fuse.

In various embodiments, the mechanical fuse includes a central portion, a radially inner wall attached to the central portion and a radially outer wall with respect to a central axis extending through the central portion of the mechanical fuse, the radially inner wall and the radially outer wall being separated by a gap. In various embodiments, the mechanical fuse includes a first fuse section extending annularly about the radially outer wall, the first fuse section being formed by a first annular cut extending circumferentially about the radially outer wall with respect to the central axis.

In various embodiments, the mechanical fuse includes a second fuse section extending annularly about the radially inner wall, the second fuse section being formed by a second annular cut extending circumferentially about the radially inner wall with respect to the central axis. In various embodiments, the mechanical fuse includes a plate member configured for mounting the mechanical fuse to the gearbox. In various embodiments, the first fuse section is located proximate a base of the gap and above the plate member with respect to the central axis and the second fuse section is located proximate a top of the gap, the top of the gap spaced an axial distance from the base of the gap.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
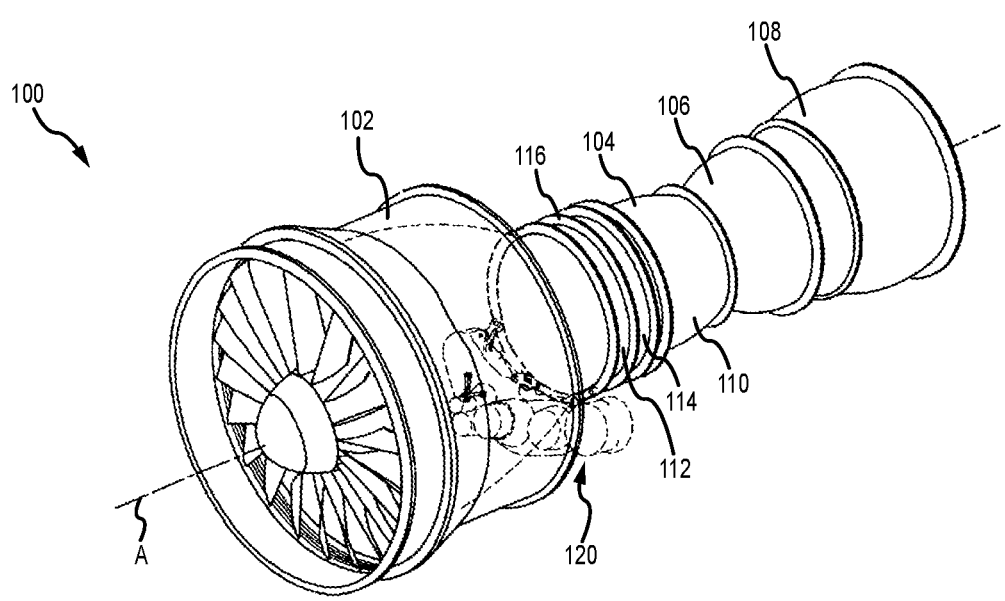
FIG. 1A provides a schematic perspective view of a gas turbine engine having a gearbox mounted to an external case of the gas turbine engine, in accordance with various embodiments.
Figure 1B:
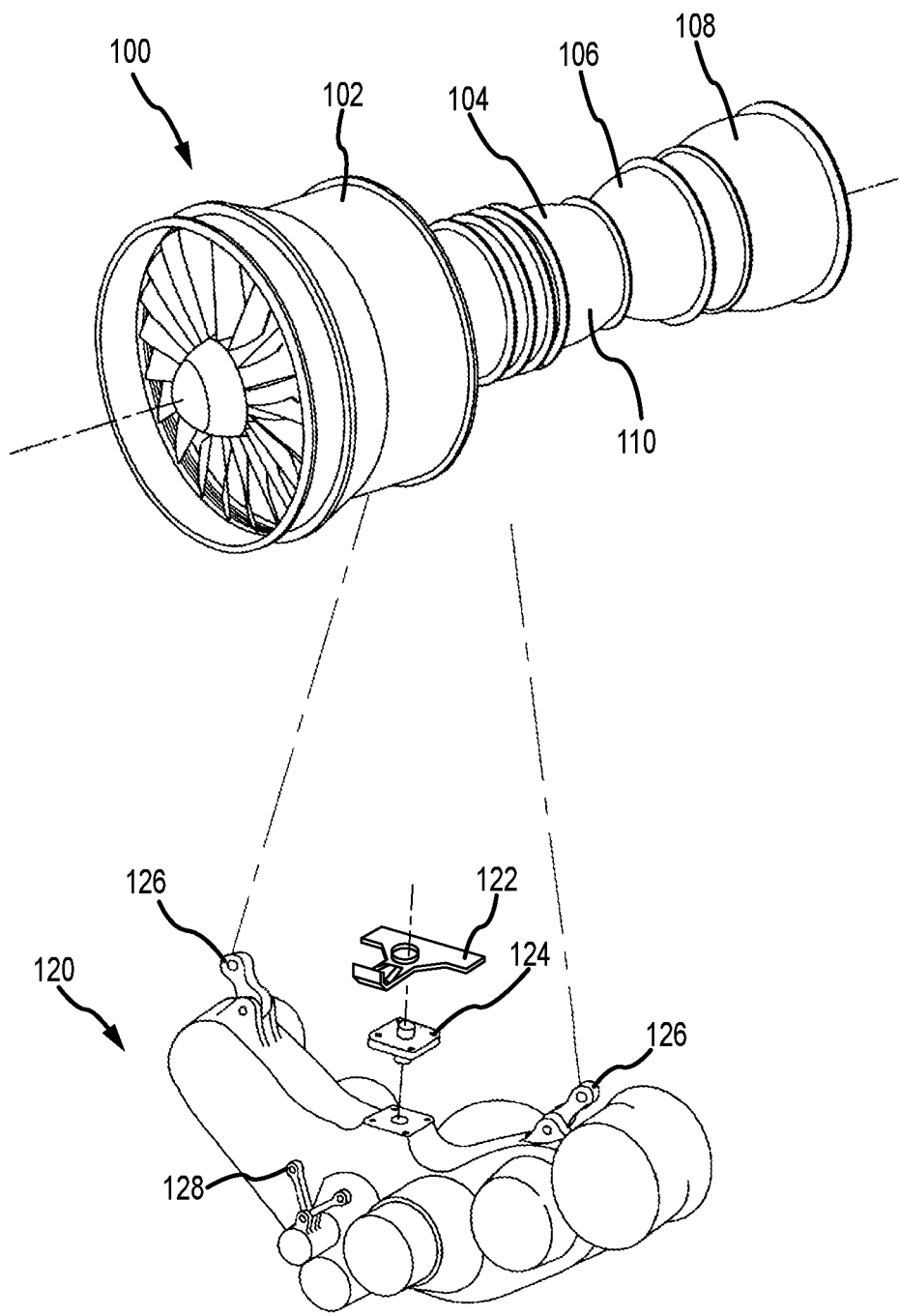
FIG. 1B provides a schematic exploded view of the gas turbine engine shown in FIG. 1A, and a gearbox mounting system for mounting the gearbox to the external case of the gas turbine engine, in accordance with various embodiments.

Referring now to the drawings, FIGS. 1A and 1B schematically illustrate a gas turbine engine 100, in accordance with various embodiments. The gas turbine engine 100 includes a fan section 102, a compressor section 104, a combustor section 106 and a turbine section 108. Typically, the compressor section 104 and the turbine section 108 each contain one or more stages that rotate about a central rotational axis A. An engine case 110 serves as a main structural support for the gas turbine engine 100 and surrounds each of the compressor section 104, the combustor section 106 and the turbine section 108. In various embodiments, the engine case 110 is constructed of individual case sections, such as a first case section 112 and a second case section 114, that are joined together at bolted flanges, such as, flange 116. A gearbox 120 is illustrated as being mounted to a forward end of the engine case 110 proximate the compressor section 104. Referring more particularly to FIG. 1B, the gearbox 120 is mounted to the engine case 110 via a support bracket 122 and a mechanical fuse 124 configured to break in the event of an overload event. In various embodiments, one or more side links 126 and a forward link 128 may also be used to mount the gearbox 120 to the engine case 110.

Figure 2A:
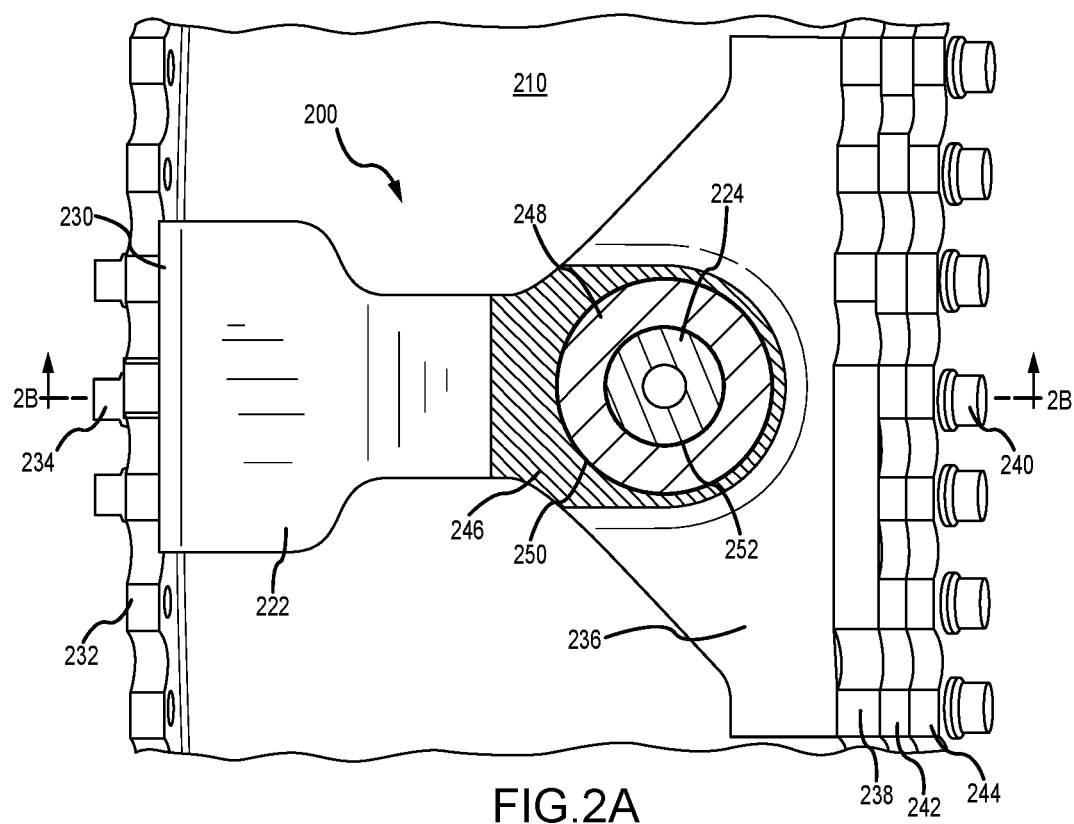
FIG. 2A provides a schematic radial view of a gearbox mounting assembly, including a support bracket and a mechanical fuse, mounted to a portion of an engine case, in accordance with various embodiments.
Figure 2B:
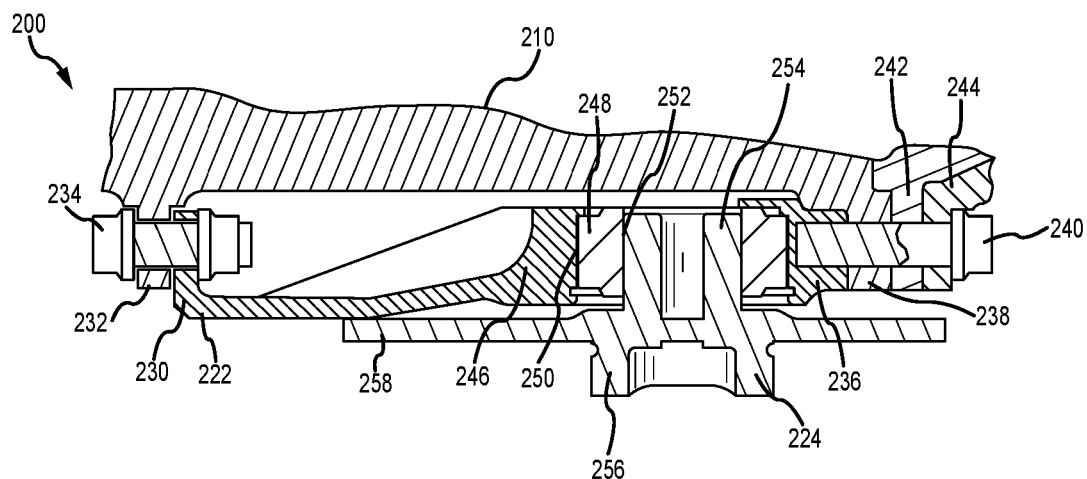
FIG. 2B provides a schematic side view of the gearbox mounting assembly shown in FIG. 2A, in accordance with various embodiments.
Figure 3:
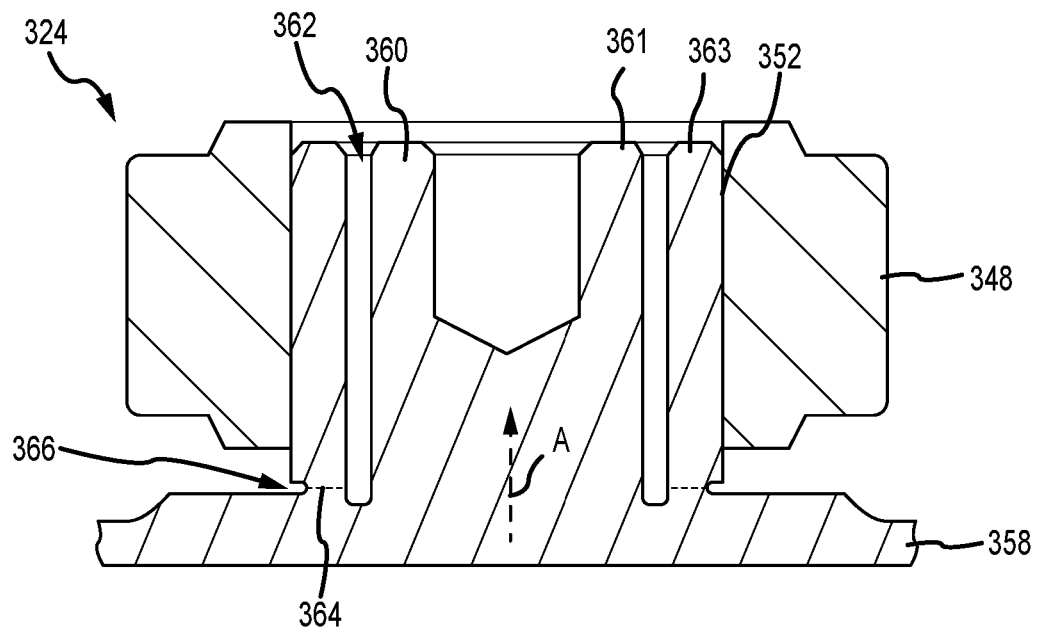
FIG. 3 provides a schematic cross-sectional view of a mechanical fuse, in accordance with various embodiments.

Referring now to FIGS. 2A and 2B schematic radial and side views, respectively, of a gearbox mounting assembly 200 mounted to a portion of an engine case 210 are illustrated, in accordance with various embodiments. The gearbox mounting assembly 200 includes a support bracket 222 and a mechanical fuse 224. In various embodiments, the support bracket 222 includes a first end 230 configured for connection to a first flange 232 of the engine case 210 via a first plurality of bolts 234 and a second end 236 configured for connection to a second flange 238 of the engine case 210 via a first plurality of bolts 240. In various embodiments, the second end 236 of the support bracket 222 may also be connected to additional flanges. For example, where the engine case 210 is a high-pressure compressor case, the second flange 238 may be positioned adjacent to an inner diffuser case flange 242 and an outer diffuser case flange 244. The support bracket 222 also includes an intermediate portion 246 located intermediate the first end 230 and the second end 236 and configured to support a bearing member 248 (e.g., a spherical bearing). In various embodiments, the bearing member 248 may be press fit into a first cylindrical aperture 250 that extends into or through the intermediate portion 246 of the support bracket 222. Similarly, the support bracket 222 includes a second cylindrical aperture 252 into which a first member 254 (e.g., a first cylindrical member) of the mechanical fuse 224 may be positioned and secured (e.g., via press fit). A second member 256 (e.g., a second cylindrical member) of the mechanical fuse in configured for insertion into an aperture extending into a casing of an auxiliary component (e.g., the gearbox 120 illustrated in FIGS. 1A and 1). In various embodiments, the mechanical fuse 224 also includes a plate member 258 (see FIG. 2B) that may be mounted to the casing of the auxiliary component (e.g., a casing of the gearbox 120). As described with reference to the drawings that follow, the mechanical fuse 224 may take on various configurations designed to break or fracture a portion of the fuse, in the event of a FBO, for example, such that the component remains attached to the engine case.

Referring now to FIGS. 3, 4, 5A, 5B and 6, several configurations of mechanical fuses are illustrated and described, in accordance with various embodiments. Starting with FIG. 3, a mechanical fuse 324 is illustrated disposed within a cylindrical aperture 352 of a bearing element 348 (e.g., a spherical bearing). The mechanical fuse 324 is a single-piece mechanical fuse having a central portion 360 defining a radial inner wall 361 and a radially outer wall 363 separated by a gap 362. Proximate a base of the gap 362 and above a plate member 358 configured for mounting to an auxiliary component is a fuse section 364. The fuse section 364 extends annularly about the radially outer wall 363 and is formed by an annular cut 366 that extends circumferentially about the radially outer wall 363 with respect to a central axis A that extends through the central portion 360 of the mechanical fuse 324. Because of the annular cut 366, the fuse section 364 that results provides a localized region (or a localized region of relative weakness in shear) that is designed to fracture during an overload event, such as a FBO, where the overload is typically applied in a radial direction with respect to the central axis A. Once the fuse section 364 fractures, the central portion 360 is able to move back and forth in the radial direction with respect to the central axis A to permit continued absorption of energy following the overload event. In various embodiments, the cross-sectional area of the fuse section 364 is determined based on an ultimate strength calculated to be less than a predicted load expected during the overload event. As an example, the cross-sectional area of the fuse section 364 may be determined using the criteria P/A=Ultimate Strength of the fuse section 364, where P is equal to 75% of the predicted overload and A is equal to the cross-sectional area of the fuse section 364. In various embodiments, the fuse section 364 has a dimension in the radial direction (with respect to the central axis A) that is less than or equal to one-half to three-quarters of a nominal thickness of the radially outer wall 363 in the radial direction.

Figure 4:
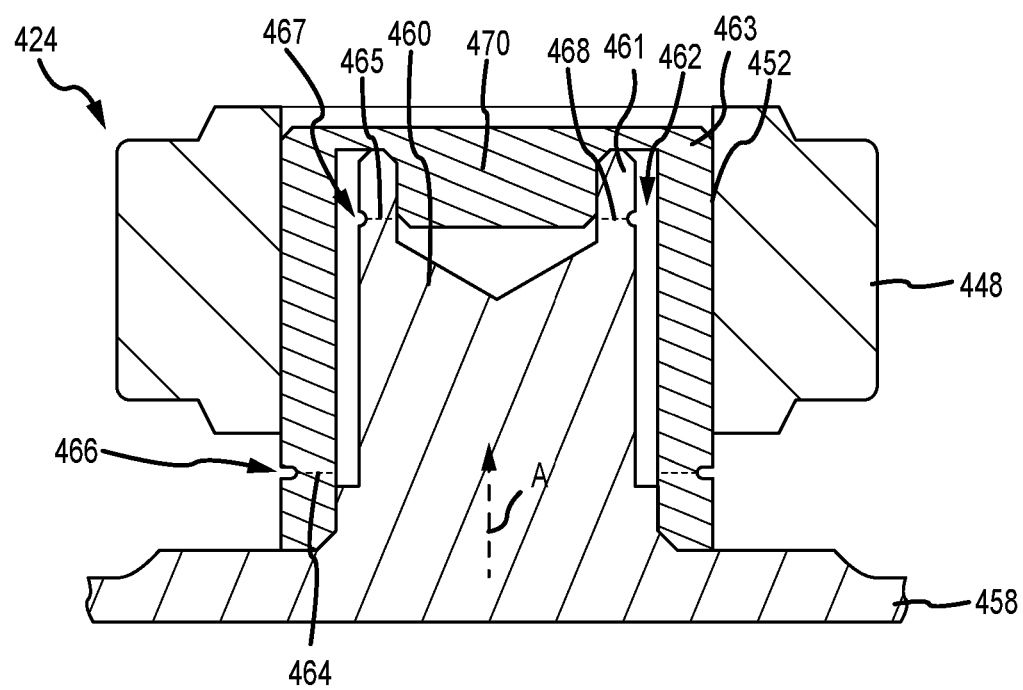
FIG. 4 provides a schematic cross-sectional view of a mechanical fuse, in accordance with various embodiments.

Referring now to FIG. 4 a mechanical fuse 424 is illustrated disposed within a cylindrical aperture 452 of a bearing element 448 (e.g., a spherical bearing). The mechanical fuse 424 is a two-piece mechanical fuse having a central portion 460 defining a radially inner wall 461 and a radially outer wall 463 separated by a gap 462. Proximate a base of the gap 462 and above a plate member 458 configured for mounting to an auxiliary component is a first fuse section 464 disposed within the radially outer wall 463. A second fuse section 465 is disposed within the radially inner wall 461 proximate a cap member 470 disposed within an annulus formed by the radially inner wall 461 and connected to the radially outer wall 463, the second fuse section 465 being spaced an axial distance from the base of the gap with respect to a central axis A that extends through the central portion 460 of the mechanical fuse 424. The first fuse section 464 extends annularly about the radially outer wall 463 and is formed by a first annular cut 466 that extends circumferentially about the radially outer wall 463 with respect to the central axis A. Similarly, the second fuse section 465 is formed by a second annular cut 467 that extends circumferentially about the radially inner wall 461 with respect to the central axis A. The first fuse section 464 provides a first localized region that is designed to fracture during an overload event, such as a FBO, where the overload is typically applied in a radial direction with respect to the central axis A, while the second fuse section 465 provides a second localized region that is designed to fracture (at least partially) during the overload event. For example, once the first fuse section 464 fractures, the central portion 460 is able to move back and forth in the radial direction with respect to the central axis A to permit continued absorption of energy following the overload event. While moving in the radial direction, typically simultaneously with fracture of the first fuse section 464, the radially inner wall 461 is loaded against the cap member 470 connected to the radially outer wall 463. The loading against the cap member 470 causes the second fuse section 465 to fracture, typically at a portion of the second fuse section 465 that is on the opposite side of the load applied by the overload event, with the portion of the second fuse section 465 of the same side as the load applied by the overload event remaining intact. In various embodiments, the cross-sectional areas of the first fuse section 464 and the second fuse section 465 are determined, similar to the discussion above, based on an ultimate strength of the fuse sections being less than a predicted load expected during the overload event.

Figure 5A:
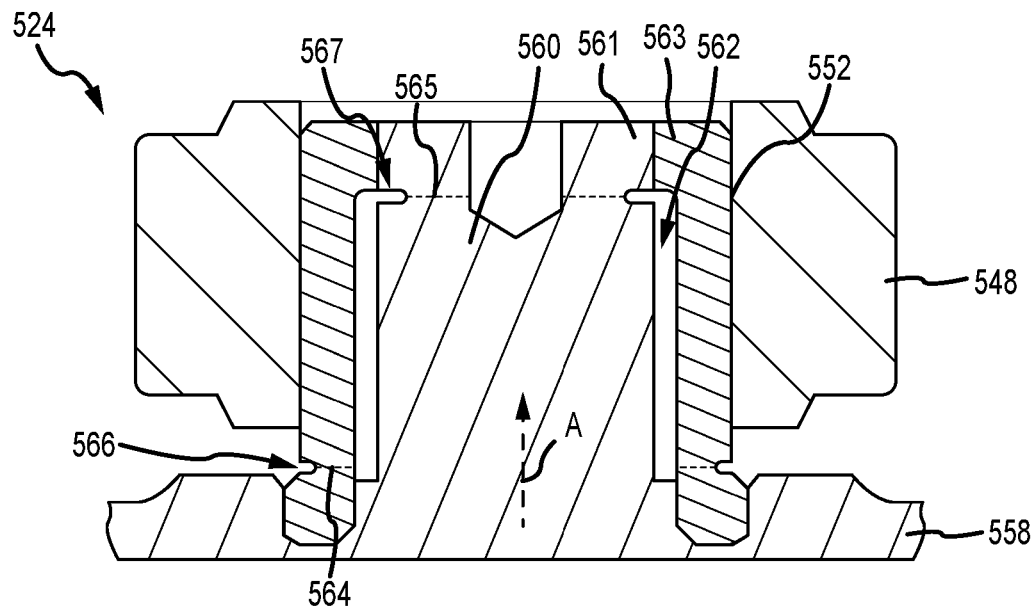
FIGS. 5A and 5B provide schematic cross-sectional views of a mechanical fuse, in accordance with various embodiments.

Referring now to FIG. 5A a mechanical fuse 524 is illustrated disposed within a cylindrical aperture 552 of a bearing element 548 (e.g., a spherical bearing). The mechanical fuse 524 is a two-piece mechanical fuse having a central portion 560 defining a radially inner wall 561 and a radially outer wall 563 separated by a gap 562. Proximate a base of the gap 562 and above a plate member 558 configured for mounting to an auxiliary component is a first fuse section 564 disposed within the radially outer wall 563. A second fuse section 565 is disposed within the radially inner wall 561 proximate the top of the gap 562, the top being the end of the gap 562 opposite the base of the gap 562. The first fuse section 564 extends annularly about the radially outer wall 563 and is formed by a first annular cut 566 that extends circumferentially about the radially outer wall 563 with respect to a central axis A that extends through the central portion 560 of the mechanical fuse 524. Similarly, the second fuse section 565 is formed by a second annular cut 567 that extends circumferentially about the radially inner wall 561 with respect to the central axis A. The first fuse section 564 provides a first localized region that is designed to fracture during an overload event, such as a FBO, where the overload is typically applied in a radial direction with respect to the central axis A, while the second fuse section 565 provides a second localized region that is designed to fracture during the overload event. For example, once the first fuse section 564 fractures, the central portion 560 is able to move back and forth in the radial direction with respect to the central axis A to permit continued absorption of energy following the overload event. While moving in the radial direction, typically simultaneously with fracture of the first fuse section 564, the radially inner wall 561 is loaded against radially outer wall 563, causing the second fuse section 565 to fracture. In various embodiments, the cross-sectional areas of the first fuse section 564 and the second fuse section 565 are determined, similar to the discussion above, based on an ultimate strength of the fuse sections being less than a predicted load expected during the overload event.

Figure 5B:
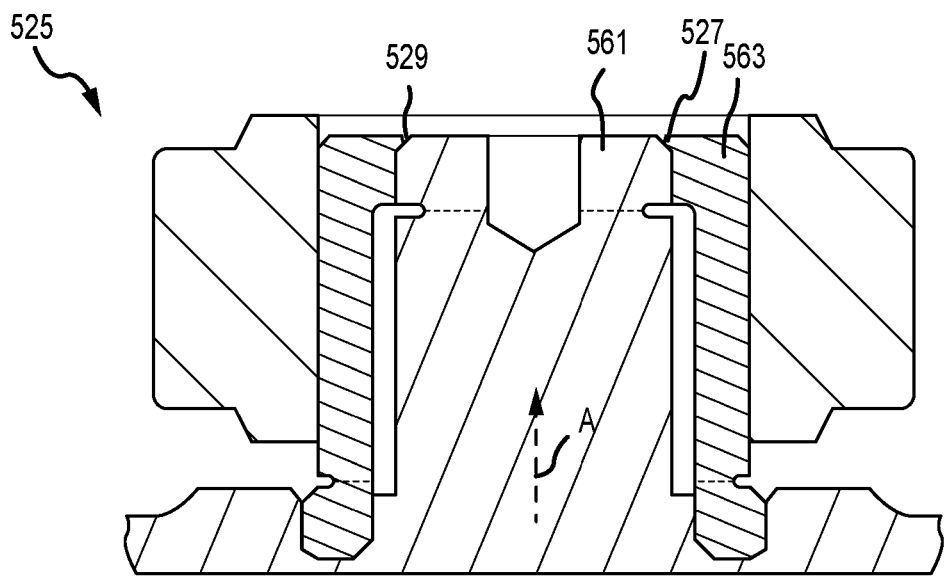

Referring now briefly to FIG. 5B, a mechanical fuse 525 is illustrated having the same features as the mechanical fuse 524 just described. The main difference between the two mechanical fuses is the radially inner wall 561 includes a chamfered portion 529 at the radially outermost and axially uppermost portion of the radially inner wall 561 and the radially outer wall 563 includes a lip portion 527 at the radially innermost and axially uppermost portion of the radially outer wall 563. When assembled, the lip portion 527 of the radially outer wall 563 extends over the chamfered portion of the radially inner wall 561. During an overload event, whereby both the first fuse section 564 and the second fuse section 565 have fractured, the lip portion 527 prevents the fractured portion of the central portion 560 from becoming loose and falling away from the mechanical fuse 525, thereby preventing the occurrence of bill of material object damage (BMOD).

Figure 6:
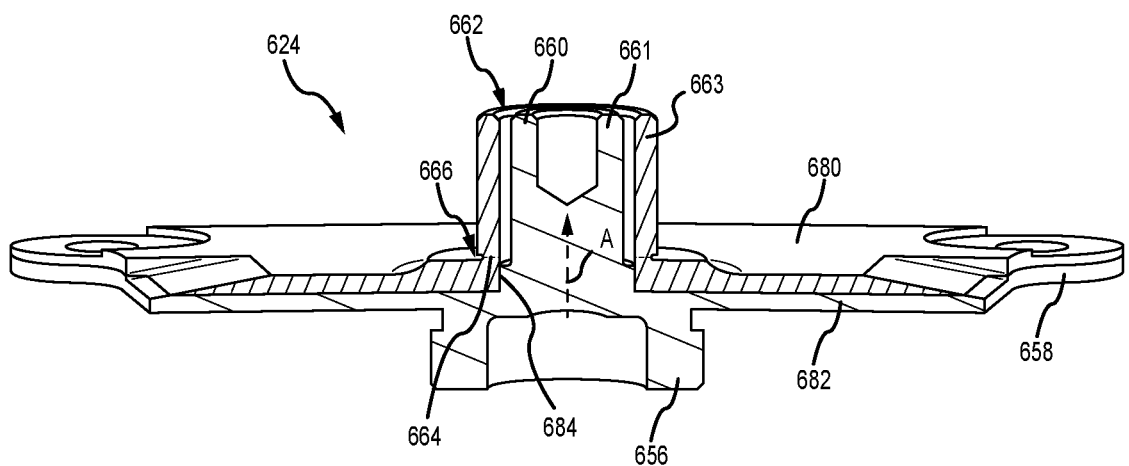
FIG. 6 provides a schematic cross-sectional view of a mechanical fuse, in accordance with various embodiments.

Referring now to FIG. 6, a mechanical fuse 624 is illustrated having features similar to the mechanical fuse 324 described above with reference to FIG. 3. The mechanical fuse 624 is a two-piece mechanical fuse having a central portion 660 defining a radially inner wall 661 and a radially outer wall 663 separated by a gap 662. Proximate a base of the gap 662 and above a plate member 658 configured for mounting to an auxiliary component is a fuse section 664. The fuse section 664 extends annularly about the radially outer wall 663 and is formed by an annular cut 666 that extends circumferentially about the radially outer wall 663 with respect to a central axis A that extends through the central portion 660 of the mechanical fuse 624. Because of the annular cut 666, the fuse section 664 that results provides a localized region that is designed to fracture during an overload event, such as a FBO, where the overload is typically applied in a radial direction with respect to the central axis A. Once the fuse section 664 fractures, the central portion 660 is able to move back and forth in the radial direction with respect to the central axis A to permit continued absorption of energy following the overload event. In contrast with the mechanical fuse 324 described above, the mechanical fuse 624 includes a first piece 680 (or a first piece of material) and a second piece 682 (or a second piece of material) that are joined together. As illustrated, the first piece 680 includes the radially outer wall 663 and an axially upper portion of the plate member 658 and the second piece 682 includes the radially inner wall 661 and an axially lower portion of the plate member 658. The second piece 682 also includes a second member 656 (similar to the second member 256 described above) configured for insertion into an aperture extending into a casing of an auxiliary component (e.g., the gearbox 120 illustrated in FIGS. 1A and 1B). In various embodiments, the first piece 680 and the second piece 682 may be joined together using a friction fit at the radial intersection 684 between the two pieces located axially below the gap 662.

Various benefits of the foregoing disclosure may be realized. For example, the various embodiments described above are based around single-piece or two-piece assemblies that simplify construction of the mechanical fuses and reduce the cost of their manufacture. The various embodiments also provide a manner to maintain the axial degree of freedom of the mechanical fuse or the axial degree of freedom of the central portion of the mechanical fuse in place by limiting movement to the radial direction within the bearing element following an overload event. The various embodiments also provide a manner of maintaining the bearing element (typically a spherical bearing) in its proper position and orientation following an overload event. The various embodiments are also well-suited for use in locations having limited space. The various embodiments are also amenable to various manner of fabrication, including machining or additive manufacturing.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Finally, any of the above-described concepts can be used alone or in combination with any of or all the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An assembly for mounting an auxiliary component to an engine case of a gas turbine engine, the assembly comprising:
   a support bracket, the support bracket having a first end configured for attachment to a first flange of the engine case, a second end configured for attachment to a second flange of the engine case, and an intermediate portion located between the first end and the second end;
   a bearing member disposed within the intermediate portion;
   a mechanical fuse disposed within the bearing member; and
   a plate member monolithic with the mechanical fuse and configured to abut the auxiliary component.

2. The assembly of claim 1, wherein the mechanical fuse includes a central portion, a radially inner wall attached to the central portion, and a radially outer wall, the radially inner wall and the radially outer wall configured with respect to a central axis extending through the central portion of the mechanical fuse.

3. The assembly of claim 2, wherein the radially inner wall and the radially outer wall are separated by a gap.

4. The assembly of claim 3, wherein the mechanical fuse includes a first fuse section extending annularly about the radially outer wall.

5. The assembly of claim 4, wherein the first fuse section is formed by a first annular cut extending circumferentially about the radially outer wall with respect to the central axis.

6. The assembly of claim 5, wherein the plate member is configured for mounting the mechanical fuse to the auxiliary component.

7. The assembly of claim 6, wherein the first fuse section is located proximate a base of the gap and above the plate member with respect to the central axis.

8. The assembly of claim 7, wherein the mechanical fuse includes a second fuse section extending annularly about the radially inner wall.

9. The assembly of claim 8, wherein the second fuse section is formed by a second annular cut extending circumferentially about the radially inner wall with respect to the central axis.

10. The assembly of claim 9, wherein the second fuse section is located proximate a top of the gap, the top of the gap spaced an axial distance from the base of the gap.

11. The assembly of claim 10, further including a cap member connected to the radially outer wall and disposed radially inside of the radially inner wall.

12. The assembly of claim 11, wherein the second annular cut is disposed proximate the cap member.

13. The assembly of claim 2, wherein the central portion and the radially inner wall are formed from a first piece of material and wherein the radially outer wall is formed from a second piece of material.

14. The assembly of claim 13, wherein the plate member is configured for mounting the mechanical fuse to the auxiliary component, the plate member including an axially upper portion connected to the radially outer wall and an axially lower portion connected to the radially inner wall.

15. A gas turbine engine, comprising:
   an engine case, the engine case including a first flange and a second flange;
   a support bracket, the support bracket having a first end configured for attachment to the first flange of the engine case, a second end configured for attachment to the second flange of the engine case, and an intermediate portion located between the first end and the second end;
   a bearing member disposed within the intermediate portion;
   a mechanical fuse disposed within the bearing member;
   a gearbox attached to the mechanical fuse; and
   a plate member monolithic with the mechanical fuse and configured to abut the gearbox.

16. The gas turbine engine of claim 15, wherein the mechanical fuse includes a central portion, a radially inner wall attached to the central portion, and a radially outer wall, the radially inner wall and the radially outer wall configured with respect to a central axis extending through the central portion of the mechanical fuse, the radially inner wall and the radially outer wall being separated by a gap.

17. The gas turbine engine of claim 16, wherein the mechanical fuse includes a first fuse section extending annularly about the radially outer wall, the first fuse section being formed by a first annular cut extending circumferentially about the radially outer wall with respect to the central axis.

18. The gas turbine engine of claim 17, wherein the mechanical fuse includes a second fuse section extending annularly about the radially inner wall, the second fuse section being formed by a second annular cut extending circumferentially about the radially inner wall with respect to the central axis.

19. The gas turbine engine of claim 18, wherein the plate member is configured for mounting the mechanical fuse to the gearbox.

20. The gas turbine engine of claim 19, wherein the first fuse section is located proximate a base of the gap and above the plate member with respect to the central axis and the second fuse section is located proximate a top of the gap, the top of the gap spaced an axial distance from the base of the gap.

* * * * *